Nov. 6, 1928. 1,690,985
V. K. LIPP
APPARATUS FOR DRAWING AND STEERING TRAILER VEHICLES
Filed July 26, 1927 2 Sheets-Sheet 1

Inventor
Victor K. Lipp
By Mason Fenwick & Lawrence
Attorneys

Nov. 6, 1928.

V. K. LIPP 1,690,985

APPARATUS FOR DRAWING AND STEERING TRAILER VEHICLES

Filed July 26, 1927    2 Sheets-Sheet 2

Inventor
Victor K. Lipp
By Mason Fenwick & Lawrence
Attorneys

Patented Nov. 6, 1928.

1,690,985

UNITED STATES PATENT OFFICE.

VICTOR K. LIPP, OF SEATTLE, WASHINGTON.

APPARATUS FOR DRAWING AND STEERING TRAILER VEHICLES.

Application filed July 26, 1927. Serial No. 208,556.

This invention relates to apparatus for drawing and steering vehicle trailers, and particularly four-wheeled automobile trailers.

One of the objects of the invention is to provide means for drawing or towing a four-wheeled trailer vehicle by a draw-bar extending from the frame of the trailer above the axle and on substantially the same level as the load on the trailer, so as to utilize all the power for pulling instead of wasting a part thereof by the usual method of constructing the trailer from its axle;

A further object is to provide means for automatically turning and steering the front wheels of a four wheeled trailer vehicle, so that the front wheels will follow substantially the same line of travel as the towing vehicle, and without the turning of the front axle of the trailer, and to so provide a trailer whereon the load may be evenly distributed over the four wheels, and thus prevent the rocking or "lashing" of the trailer when loaded unevenly, and also avoid the usual difficulty of turning the front axle under the load;

A still further object is to provide means for automatically steering and turning the front wheels of a four-wheeled trailer, by means of a steering arm operated by the drawbar connection with the towing vehicle, both in cases where the front springs and frame of the trailer extend a short distance ahead of its front axle, and in cases where the front springs and frame or body of the trailer extend a longer distance ahead of its front axle.

I have illustrated my invention by the accompanying drawings, omitting therefrom the rear part of the trailer, which is constructed in the usual manner.

Figure 1:
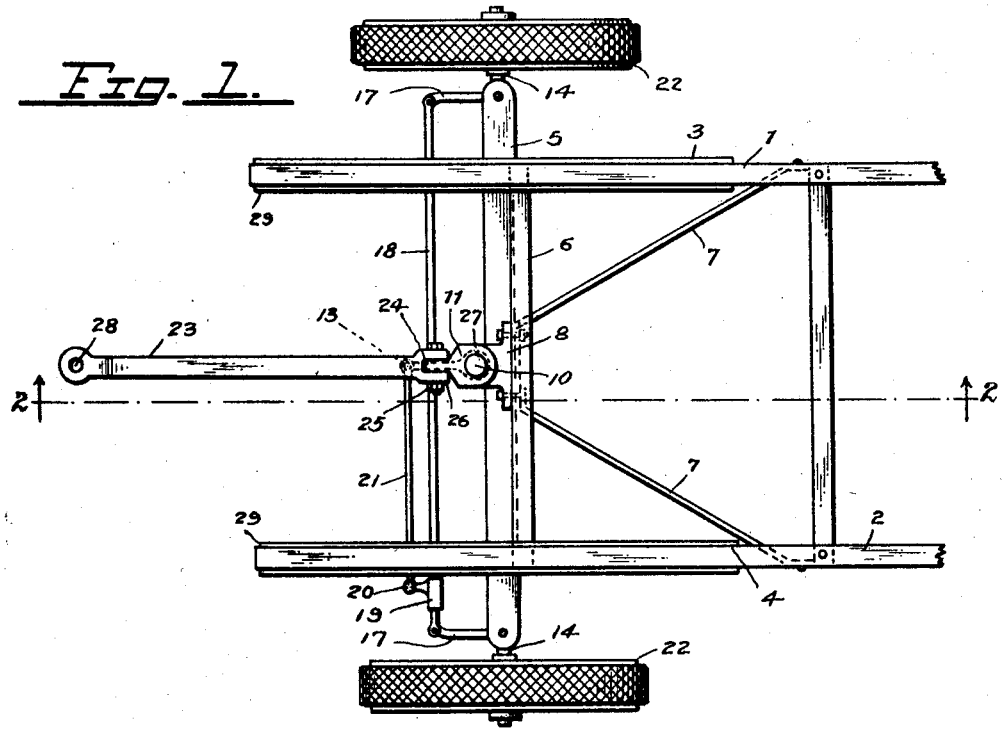
Figure 2:
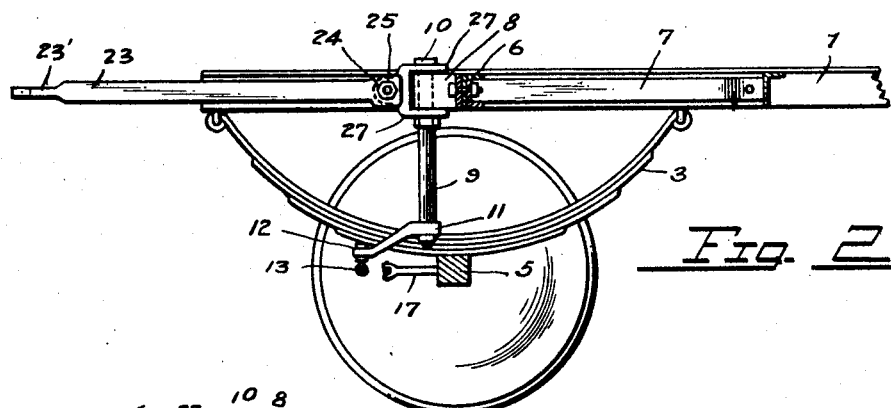
Figure 3:
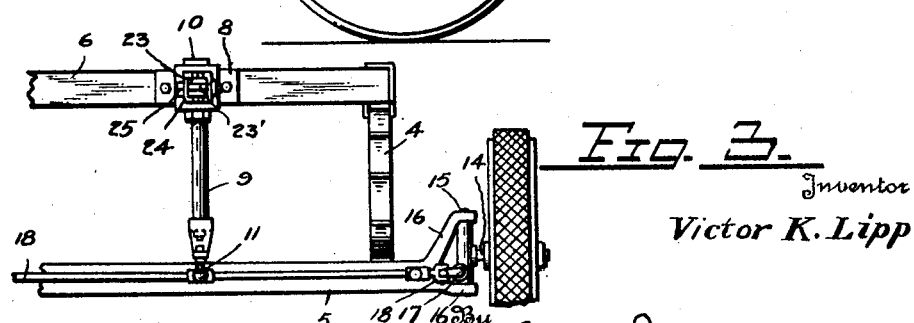
Figure 4:
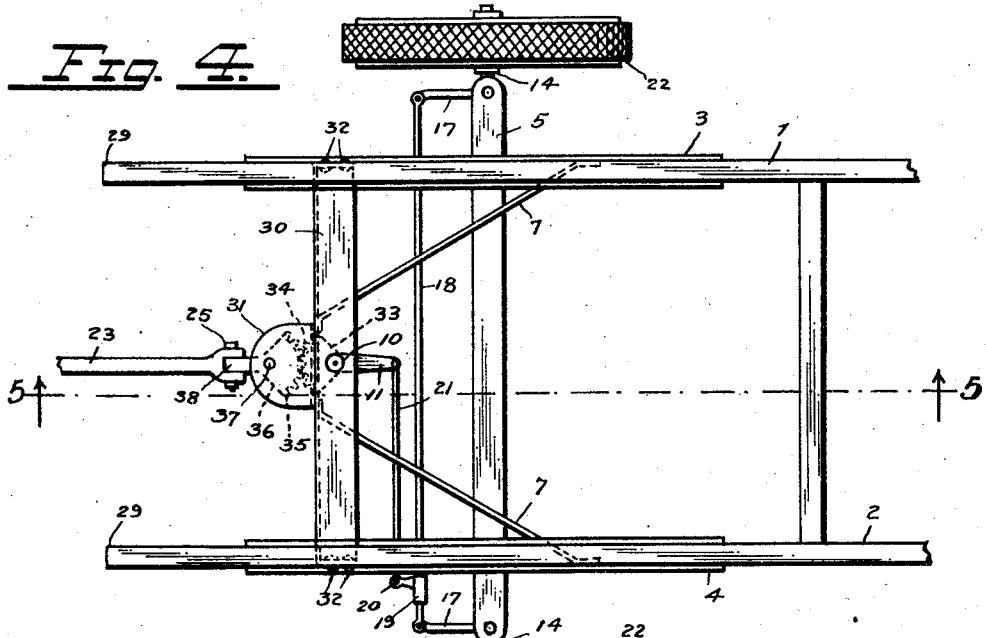
Figure 5:
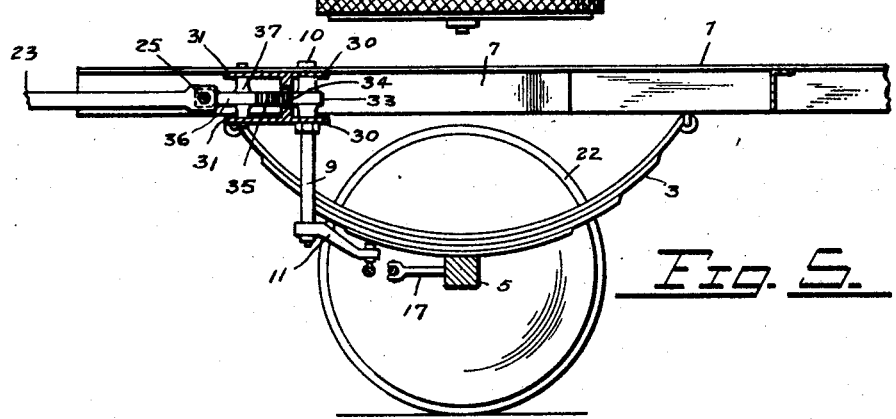
Figure 6:
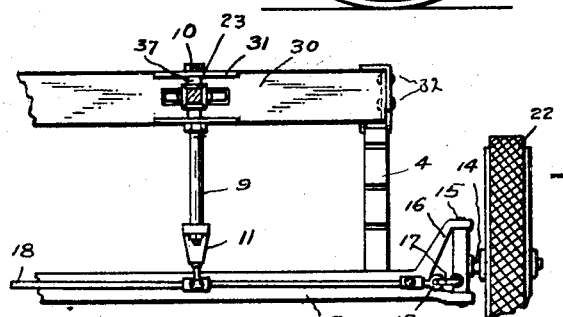

Figure 1 represents a top plan of the apparatus with the steering arm protruding forward, and short extension of the frame in front of the axle. Figure 2 is side elevation taken on line 2—2 of Fig. 1. Figure 3 is front elevation of part of Figure 1. Figure 4 represents a top plan of the apparatus with the steering arm protruding backward, and longer extension of the frames in front of the axle. Figure 5 represents a side elevation taken on lines 5—5 of Fig. 4; and Figure 6 represents a front elevation on part of Fig. 4.

Like numerals on the different figures represent like parts. 1 and 2 represent the sides of ordinary frame for a trailer vehicle used with automobiles, mounted on front springs 3 and 4 attached to a main axle 5, and as usual the frames are at some distance above the axle. Ordinarily trailers are connected to a towing car from the front axle of the trailer, to some point on the towing car higher than the axle of the trailer, and thus the pulling power of the towing car is applied obliquely downward and part of the power is thereby lost in tending to lift the trailer; and it is part of my invention to provide for the connection with the trailer on a line with the frames thereof, and thus the power applied from the towing car will be all utilized in moving the load and trailer in the line of attachment. And I accomplish this, by attaching a cross-bar 6 securely to the two side frames, with reinforcing braces 7—7, bolted to a holding block 8 in which is pivotally held a steering post 9, with a supporting head 10 above the block 8. On the lower end of the post is rigidly fixed an arm 11, with a pin 12 and socket ball 13 attached below the outer end of the arm. The ordinary wheel spindles 14 are held with the usual pivot pins 15 through the end jaws 16 of the axle, and controlling levers 17 are attached to and project forward from the inner ends of the spindles, with the usual tie rod 18 pivotally connecting the ends of the levers 17. Near one end of the tie rod is attached a sleeve 19 wth a projecting socket ball 20 attached thereto. A shift rod 21 with a socket at each end for operating over the balls 13 and 20 is adjusted over and between the balls, forming a ball and socket joint at said ends, and permitting freedom of action for the frame to rise and fall on the springs, but positively moving the tie rod laterally with the levers, and wheels 22 when the arm 11 is moved toward either side by the turning of the post 9.

The post 9 is turned in connection with the draw-bar 23 which is provided with perpendicular jaws 24 which are attached pivotally by pin 25 to and over a tongue 26, which extends from horizontal jaws 27, which latter jaws are pivotally connected to and over the block 8 by the upper end of the post 9, and the post is held rigidly to the jaws 27 by an ordinary wedge key or other usual means.

The front end of the drawbar 23 is flattened at 23′ and provided with a hole 28 for attachment to the center and rear end of the body of the towing car in any usual manner.

In operation, with the front ends 29 of the frames extending only a short distance in front of the axle 6, the front wheels of the trailer will practically follow the path of the rear wheels of the towing car, as in turning a corner, the front of the bar 23 being attached to center of the towing car will tend to pull the trailer forward to a proper position for turning to follow the towing car around the corner. The bar 23 being turned to the same side as the towing car moves the wheels sufficiently to cause the trailer to also turn the corner before the bar 23 will strike the short front ends 29 of the frames as shown in Fig. 1.

But as the frames of trailers are in some cases extended forward in front of the axle to a greater distance as shown in Fig. 4, they will so prevent the drawbar turning to either side enough to turn the wheels sufficiently to follow the towing car around a corner, and it is then necessary to provide means while preferably using a bar of practically the same length, for turning the wheels to the same degree, with the longer frame or overhang of a trailer body; and I accomplish this object by placing the steering post further forward, and adjusting the arm of the steering post backward to connect with the shift rod and levers 17. In practice the levers cannot be lengthened, and are of substantially the same length as the arm on the steering-post.

I have illustrated such additional means by the figures 4, 5, and 6, which show the front ends 29 of the side frames extending forward from the axle a greater length for the purpose of a longer body or for longer springs. The front cross-bar in this instance is marked 30 and is preferably a suitable casting with a front extension of casing 31 as part thereof, the ends of the casting being attached to the side frames by bolts or rivets 32. The steering post 9 is pivotally mounted through the bar 30, and has attached to its shank a quadrant 33 with gear teeth 34 across its front edge extended forward, which teeth mesh in similar teeth 35 on a similar quadrant 36 which is mounted on a pivot pin 37 perpendicularly held between the upper and lower portions of the casing 31. The front end of the quadrant member 36 extends in form of a tongue 38 forward from the pin 37, and the drawbar 23 is pivotally held thereto by the horizontal pin 25.

It will be seen that the casting 30 is affixed to the side frames considerably in front of the axle, and the connections with the rear end of the drawbar are also carried forward accordingly, so that the front end of the drawbar may be moved to either side without striking the extended ends 29 of the frames, when the towing vehicle is turning a corner, and thus the front wheels of the trailer may be also properly guided or turned at the proper time by the steering arm 11, which in this form is extended backward from the post 9, and connected in the same manner with the wheels as above described for the shorter frames.

With the front wheels of the trailer being turned as herein shown, the load on the trailer may be equally distributed on the front and rear axle, and the vehicle will travel more smoothly than when a greater portion is placed on the rear axle as must be done to prevent friction of the turning axle on trailers whereon the axles are constructed to move for turning the vehicle.

Having described my invention, I claim as new:

Means for drawing and steering a trailer vehicle having longitudinal frame members, steering wheels mounted on spindles having lever arms attached thereto, said arms being connected by a tie rod, comprising a block positioned centrally between the frame members and in the same plane therewith, a shaft mounted perpendicularly in the block, a lever arm secured perpendicularly to one end of the shaft, a shaft rod pivotally connected to said lever arm and the tierod and a tongue member attached to the shaft and extending therefrom in the plane of the frame members for drawing the vehicle and controlling through said shaft the steering wheels, whereby the load of the vehicle is transmitted through said tongue in the plane of said frame of the vehicle.

In testimony whereof I affix my signature.

VICTOR K. LIPP.